(12) United States Patent
Harnish et al.

(10) Patent No.: US 12,626,315 B2
(45) Date of Patent: May 12, 2026

(54) SYSTEMS AND METHODS FOR IDENTIFYING TRAVEL OPTIONS FOR USERS CONSISTENT WITH CORPORATE TRAVEL POLICIES

(71) Applicant: MASTERCARD INTERNATIONAL INCORPORATED, Purchase, NY (US)

(72) Inventors: Justin Harnish, Salt Lake City, UT (US); Mohit Taneja, Kildare (IE); Natesh Babu Arunachalam, Herriman, UT (US); Nick Baguley, Salt Lake City, UT (US); Nolan Fillet, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 35 days.

(21) Appl. No.: 18/783,330

(22) Filed: Jul. 24, 2024

(65) Prior Publication Data

US 2026/0030694 A1      Jan. 29, 2026

(51) Int. Cl.
G06Q 50/14          (2012.01)
G06Q 10/0635       (2023.01)
G06Q 30/0601       (2023.01)

(52) U.S. Cl.
CPC ......... *G06Q 50/14* (2013.01); *G06Q 30/0631* (2013.01)

(58) Field of Classification Search
None
See application file for complete search history.

(56) References Cited

U.S. PATENT DOCUMENTS 8,930,236 B2 *   1/2015   Gillenson .......... G06Q 30/0211
                                                                 705/14.15
10,083,474 B2 *   9/2018   Knight ................... G06Q 50/12
            (Continued)

FOREIGN PATENT DOCUMENTS

KR        20220124069 A       9/2022

OTHER PUBLICATIONS

Xu, Jun, "AI in ESG for Financial Institutions: An Industrial Survey," 2024, Cornell University, arXiv, https://arxiv.org/abs/2403.05541, 31 pages. (Year: 2024).*

(Continued)

*Primary Examiner* — Michael Fuelling
(74) *Attorney, Agent, or Firm* — Harness, Dickey & Pierce, P.L.C.

(57)          ABSTRACT
Systems and methods are provided for identifying travel options, for users, consistent with corporate policies. One example computer-implemented method includes receiving, from a user, a travel request for travel from an origin to a destination and retrieving additional input data including environmental, social and/or governance (ESG) goals of a first entity, with which the user is associated, and a carbon offset program of the first entity. The method also includes applying a generative artificial intelligence (AI) model to the travel request, the ESG goals of the first entity and the data representative of the carbon offset program, to generate an output travel recommendation that includes a travel itinerary and a carbon offset purchase option. The method then includes presenting the travel recommendation to the user and purchasing the carbon offset option from the recommendation, from a participant, in response to acceptance of the travel recommendation by the user.

18 Claims, 3 Drawing Sheets

(56) References Cited

U.S. PATENT DOCUMENTS

| | | | | |
|---|---|---|---|---|
| RE49,562 E | * | 6/2023 | Bruce | G06Q 30/0242 |
| | | | | 705/7.28 |
| 12,039,263 B1 | | 7/2024 | Mondlock et al. | |
| 2009/0157534 A1 | * | 6/2009 | Arsiwala | G06Q 40/12 |
| | | | | 705/37 |
| 2011/0087578 A1 | * | 4/2011 | Finck | G06Q 40/04 |
| | | | | 705/37 |
| 2011/0246246 A1 | | 10/2011 | Johnson | |
| 2014/0278614 A1 | * | 9/2014 | Delost | G06Q 10/025 |
| | | | | 705/6 |
| 2017/0053209 A1 | | 2/2017 | Céret et al. | |
| 2017/0053363 A1 | * | 2/2017 | Maheshwari | G06Q 20/10 |
| 2020/0027039 A1 | * | 1/2020 | Miller | G06Q 10/025 |
| 2020/0111105 A1 | * | 4/2020 | Gupta | G06Q 20/065 |
| 2023/0208869 A1 | | 6/2023 | Bisht et al. | |

OTHER PUBLICATIONS

Mastercard Incorporated, "Compliance with Voluntary Carbon Market Disclosure Act, California Assembly Bill No. 1305," https://www.mastercard.com/content/dam/public/mastercardcom/global/en/coreresponsibility/sustainability/california-ab-1305-compliance.pdf, one (1) page, excludes hyperlinks & colors (Year: 2020).*

* cited by examiner

SYSTEMS AND METHODS FOR IDENTIFYING TRAVEL OPTIONS FOR USERS CONSISTENT WITH CORPORATE TRAVEL POLICIES

FIELD

The present disclosure generally relates to systems and method for use in identifying travel recommendations and associated offsets, for users, consistent with corporate environmental, social and/or governance (ESG) policies, through generative artificial intelligence (AI).

BACKGROUND

This section provides background information related to the present disclosure which is not necessarily prior art.

Corporate travel is provided to enable employees, executives, contractors, etc. (broadly, users), to be in places pertinent to job situations, duties, etc. In selecting travel, users are known to have options in specific travel for corporate purposes, such as, for example, mode of travel, time of day, day of week, etc. In connection therewith, corporations are known to impose travel policies, which limit certain options, including, specifically, the cost associated with the travel, travel class, modes of travel, etc. Corporations often employ platforms that offer options to users, where the options are consistent with one or more policies.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Users employed or otherwise associated with corporations may be limited to corporate travel by policies of the corporations. In some instances, the corporations often employ platforms that offer travel options to the users, where the options are consistent with one or more policies. In this way, alternate options are often hidden, along with the policies, whereby users are not offered insights into the alternate travel options. What's more, corporate policies are limited, generally, to cost, eligibility for tax treatment, etc., while goals, policies, etc., related to environmental, social, and/or governance (ESG) are omitted.

Uniquely, the systems and methods herein provide a generative artificial intelligence (AI) platform, which is configured to rely on ESG data and offset programs, in identifying travel recommendations and associated offsets, for corporate travel by users.

Figure 1:
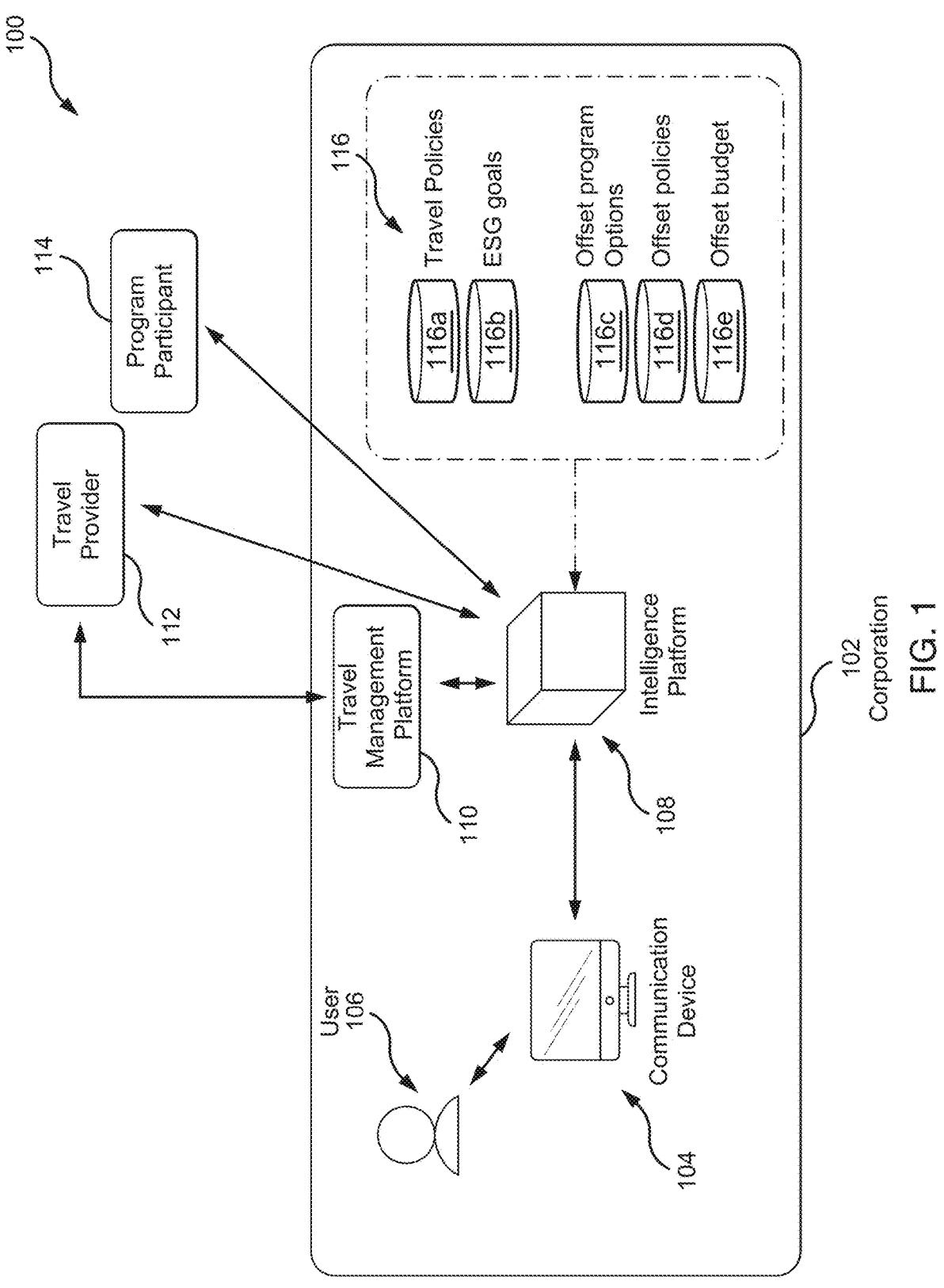
FIG. 1 illustrates an example system of the present disclosure suitable for use in identifying travel recommendations and associated offsets, for users, consistent with corporate environmental, social and/or governance (ESG) policies.

FIG. 1 illustrates an example system 100, in which one or more aspects of the present disclosure may be implemented. Although the system 100 is presented in one arrangement, other embodiments may include systems arranged otherwise depending, for example, on travel options, transit options, accessibility of transit data, accessibility of user data, processing of purchase options for travel, etc.

The system 100 generally relates to travel planning for a corporation 102, and includes a communication device 104 of a user 106 and an intelligence platform 108 (in communications with and/or including a data structure 116). The intelligence platform 108 is coupled in communication with a travel management platform 110 of the corporation 102, a travel provider 112, and a program participant 114, via one or more networks. The networks are represented by the arrowed lines, and may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The corporation 102 (broadly, an entity) is a business entity in this example embodiment, which engages with customers to provide services, products, etc., to the customers. The corporation may be organized under any applicable law, regulations, etc., and is not limited to a legal definition of corporation. The corporation 102 may be for profit or nonprofit, and/or may be a governmental agency, a partnership, etc.

The user 106, in this example embodiment, is an employee of the corporation 102, and is assigned responsibilities that require travel, from time to time. The term "employee" is intended to be broad and includes any person that is hired, appointed, or associated with the corporation 102 to perform one or more tasks on behalf of the corporation 102. As such, the user 106 may be a worker, staff person, contractor, board member, executive, etc. of (or associated with) the corporation 102.

In connection therewith, the travel management platform 110 is configured to provide for booking, tracking and management of travel by the user 106 and other employees of the corporation 102.

It should be appreciated that the user 106 interacts with the travel management platform 110 to define a profile for the user 106. In particular, in this embodiment, the travel management platform 110 is configured to solicit preferences from the user 106. The preferences may include, for airline travel, for example, carrier preferences, seat preferences (e.g., window, aisle, back, front, etc.), meal type, travel class, etc. It may be appreciated that the preferences of the user 106 may be otherwise for different types of travel. The travel management platform 110 is configured to store the preferences as part of the profile specific to the user 106, which is accessible to the intelligence platform 108. In at least one embodiment, the intelligence platform 108 is configured to solicit the preferences from the user 106 (rather than the travel management platform 110).

In addition, the travel management platform 110 is configured to store a corporate profile for the corporation 102. The corporate profile defines, without limitation, policies for air travel by employees of the corporation 102. The travel policies are stored in a travel policies data structure 116a (of the data structure 116). Such policies may include rules and restrictions, which, in turn, may be based on, for example, travel class (e.g., business class eligibility, etc.), peak travel, destination, cost, carrier (e.g., carrier preferences, etc.), etc. It should be appreciated that the corporate profile may include various different types of rules and restrictions depending on the type of travel to be booked by the employee, etc.

With continued reference to FIG. 1, the travel provider 112 is configured to provide travel services to users, including the user 106. The travel provider 112 may include, for example, an airline carrier, which operates flights from various points of origin to various destinations.

The program participant 114 is configured to offer carbon offsets for sale, where the carbon offsets are backed by a carbon offsetting activity of the program participant 114. In particular, the program participant 114 and other participants are associated with projects, which generally provide a carbon benefit. The carbon benefit, in turn, is provided for sale, by the program participant 114, to others to offset some activity, from a carbon perspective, of the party (e.g., the corporation 102, etc.). Example projects may include, without limitation, reforestation, biogas capture, renewable energy projects (for example, in regions heavily dependent on fossil fuels, etc.), landfill gas combustion, forest preservation, hydroelectric power projects, wind power projects, regenerative farming projects, etc.

It should be appreciated that the travel provider 112 and the program participant 114 are generally representative of multiple travel providers and participants, respectively, as there may be tens, hundreds, etc., of each in various system embodiments.

In this example embodiment, the corporation 102 is associated with an environmental, social, and governance (ESG) program. The ESG program defines the ESG goals of the corporation 102, which may be based on, for example, reducing emissions, increasing energy efficiency, and transitioning to renewable resources. The ESG goals of the corporation 102 are stored in ESG goals data structure 116*b* (of the data structure 116).

In connection therewith, the corporation 102 is also associated with a carbon offset program. In this example embodiment, the carbon offset program includes a listing of carbon offset participants stored in offset program options data structure 116*c* (of the data structure 116), carbon offset policies stored in offset policies data structure 116*d* (of the data structure 116), and a carbon offset budget defined in offset budget data structure 116*e* (of the data structure). In particular, the listing of carbon offset participants includes a listing of various participants, which may be leveraged to offset the carbon emissions of the corporation 102. The participants include, for example, the program participant 114 and various other participants. In this example embodiment, the program participant 114 is associated with, for example, a specific reforesting project. It should be appreciated that the participants may be involved in various similar or dissimilar projects which, ultimately, provide for offsetting carbon emissions in one or more of a variety of manners.

In connection with the above, it should be appreciated that the profile for the user 106 may include a selection of a participant in the carbon offset program, which may be used as a default in connection with the operations described below.

Additionally, the carbon offset policies may include, without limitation, rules and restrictions related to the type, location, etc., of carbon offset participants eligible to be included in the listing of carbon offset participants. One example carbon offset policy may restrict participants to within a radius of a threshold number of miles from branch location(s) of the corporation 102, whereby the actual carbon offset imposed by the participant is also in the location(s) of the corporation 102. Also, the carbon offset budget is a budget set by the corporation 102 in connection with, or apart from, the ESG goals of the corporation 102.

In this example embodiment, the intelligence platform 108 is configured to interact with the user 106 to determine a travel request and to return the recommendation for travel consistent with the policies and budget included within the data structure 116.

In particular, in connection with the need to travel, the user 106 accesses the intelligence platform 108, via the communication device 104. The communication of device 104 may include, for example, a laptop, a smart phone, a tablet, etc., which is configured to access the intelligence platform 108, via a web browser or application specific to the intelligence platform 108, directly or via an API, etc. In response, the intelligence platform 108 is configured to solicit a travel request from the user 106. More generally, the intelligence platform 108 is configured to solicit an action from the user 106, such as, for example, book travel, change carbon participant default, change travel profile, etc. The intelligence platform 108 is configured, then, to receive changes to the carbon participant default and/or the travel profile of the user 106 and to implement the changes requested.

In this example, the user 106 provides the travel requests, which includes an origin, a destination, a departure date, and a return date. An example travel request includes from Salt Lake City (SLC) to New York (NYC) leaving on November 7 and returning on November 12.

In response to the travel request, the intelligence platform 108 is configured to impose one or more security policies on a generative artificial intelligence (AI) model to be used in selecting a recommendation for the travel request. The one or more security policies may relate specifically to data privacy and/or data security, ensuring proper operation of the generative AI model, etc. In addition, the intelligence platform 108 may be configured to determine the input data is well structured, for example, relevant, constrained, directed, etc. to the given task (e.g., the booking of corporate travel and application of carbon offsets in alignment with ESG goals, etc.). In connection therewith, well-structured data may include text inputs to the intelligence platform 108, responses from ESG goals, or carbon offset programs. Conversely, unstructured data may include audio or video inputs, etc. Providing such well-structured data, at the outset, may additionally aid in ensuring a task-specific intelligence platform 108 (and aid in inhibiting hallucinations of the intelligence platform 108 and other potential, broad range security problems with regard to application of the modeling herein).

Next, the intelligence platform 108 is configured to convert the travel request, along with the policies, budget, etc. from the data structure 116, to embeddings representative of the same. To this feature, generative AI models do not read strings of text, but instead vector embeddings or simply embeddings, which are mathematical representations of the content and, more particularly, context of the string of text. In connection therewith, an example GenAI vector embedding for the string of text "vector embeddings are the language of GenAI" may include (0.6, 0.3, 0.7, 0.433, 0.65, . . . ). The values included in the vector embedding may be indicative of the underlying data and the relative difference(s) therebetween.

Further, the intelligence platform 108 is configured to input the embeddings to the generative AI model, for example, as part of a prompt, for generating an output travel recommendation. It should be appreciated that the generative AI model is trained on a substantial volume of data (e.g., the Internet, etc.), and that the embeddings representative of the travel request, along with additional data from the data structure 116, are input, as part of the prompt, to fine tune the generative AI model in outputting the travel recommendation. In this way the recommendation is consistent with the travel requests and also the ESG goals of the corporation 102, the travel of the corporation 102 and the carbon offset program of the corporation 102. In addition, how well matched embeddings are to one another (e.g., prompt vs. the ones the model has been trained on, etc.) may determine the attention the modeling gives to embeddings when the generative AI model is responding to a prompt. That said, the travel recommendation includes, specifically, a travel itinerary (e.g., flights, etc.) to get the user 106 from the origin to the destination, on the prescribed days, and a carbon offset purchase option consistent with the preference of the user 106 and the above policies, budget, goals, etc. In connection therewith, the travel management platform 110 may be configured to provide a schedule of available flights, available for the particular request of the corporation 102 and/or user 106, for use by the intelligence platform 108 (based on interaction with the travel provider 112, etc.).

In this example embodiment, the generative AI model may include, for example, the OpenAI GPT4 model, the Anthropic Claude model, the Meta Llama model, the Google Gemini model, etc., but may be otherwise in other embodiments. In connection therewith, such AI model(s) may be multimodal and may (or may not) rely on natural language. Additionally, or alternatively, the model may further include a large language model, or LLM, in still other embodiments. In connection therewith, the model(s) (e.g., LLM(s), etc.) may weight contextual clues and/or content clues of prompts in the conversation, as compared to its training data, and provide greater attention or weight to those clues nearer in this vector space.

The intelligence platform 108 is configured to convert the output recommendation from the generative AI model (or other model), which is in the form of embeddings, into natural language. The conversational nature of the generative AI model may provide heightened attention to prompts and answers, converted into embeddings, to ensure that desired (e.g., optimal, etc.) responses are generated based on the specific input data.

The intelligence platform 108 is configured to subject the output from the generative AI model, in natural language, to output controls, for the output recommendation, sufficient to ensure bias reduction, hallucination controls, and other restrictions thereon. For instance, a user in the loop governance may create deterministic lookups of keywords to flag in output controls. Each user 106, for example, may also have a limited list of template outputs to include the travel location, dates and times; carbon offset program approved; and ESG goal impact; etc. (e.g., thereby limiting verbosity, content, detail, and error on output, etc.). In connection therewith, the model(s) (e.g., the LLM(s), etc.) may restrict outputs with keyword controls, and thus, summarize templates that reduce conversations and associated issues.

Next, the intelligence platform 108 is configured to present the recommendation to the user 106, via the communication device 104. An example travel itinerary of the output recommendation includes a flight number and carrier of a flight from the origin city to the destination city on the specified days and the times of the flight (e.g., FLIGHT 1234, leaving SLC at 10 am MT on November 7, and FLIGHT 4321, leaving NYC at 10 am ET on November 12, etc.). In addition to the flight, the output recommendation includes a summary of the travel from a carbon offset perspective, i.e., a number of miles or 3000 miles, and an intention to purchase carbon offsets consistent with the default participant, i.e., the program participant 114 being included in the listing of participants, and the offset policies and budget of the carbon offset program of the corporation 102.

It should be appreciated that the output recommendation may be presented to the user 106 in various manners and/or interfaces.

In response, the user 106 provides an input to book the travel, whereby the intelligence platform 108 is configured to receive the input from the user 106, to instruct the travel management platform 110 to book the travel, and to purchase the carbon offsets from the program participant 114. In addition the intelligence platform 108 is configured to update the ESG goals of the corporation 102 and also the carbon offset budget of the corporation 102 in the data structure 116. In connection therewith, the intelligence platform 108 is configured to display one or more interfaces to the user 106, or other users, indicating the contribution of the flight to the ESG goals of the corporation 102 and/or a carbon offset program.

In this embodiment, the intelligence platform 108 is configured to further offer the user 106 the option to modify the output recommendation. Consistent therewith, the intelligence platform 108 is configured to return to the generative AI model, with the additional input, for example, of a decline of one or both of the flights included in the recommended travel and or a change to the selected participant by the user 106. Based on the additional input, the intelligence platform 108 is configured to output a different travel recommendation for the user 106, which is also consistent with the travel request and the policies, budget, goals, etc. included in the data structure 116. The user 106 may interact with the intelligence platform 108 a number of times, as appropriate, to receive an output travel recommendation acceptable to the user 106.

It should be appreciated that the intelligence platform 108 is configured to display one or more interfaces indicative of the ESG goals and/or carbon offset budget, as appropriate, to one or more users associated with the corporation 102, or outside the corporation 102. In this manner, the intelligence platform 108 is configured to provide an integration of travel planning for employees of the corporation 102 with the ESG goals and/or carbon offset program of the corporation 102.

Figure 2:
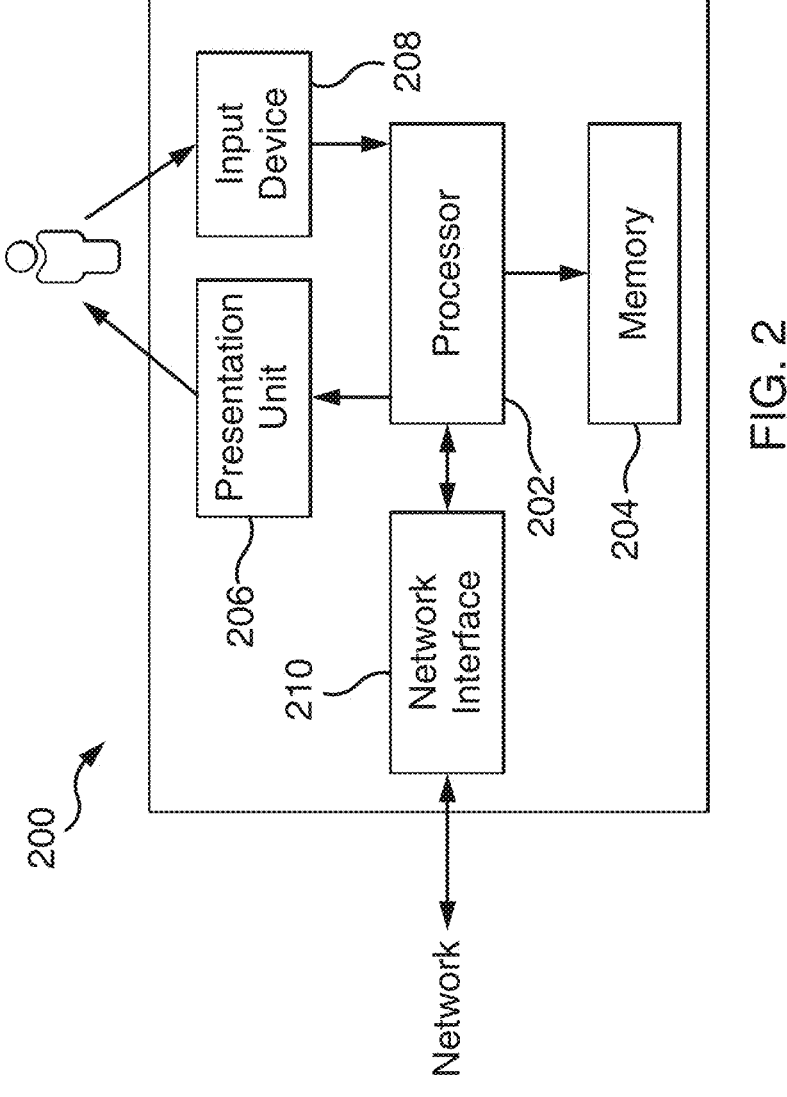
FIG. 2 is a block diagram of an example computing device that may be used in the system of FIG. 1.

FIG. 2 illustrates an example computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the communication device 104, the intelligence platform 108, the travel management platform 110, the travel provider 112, and the program participant 114, for example, include or are included in, or integrated with, a computing device consistent with computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to the processor 202. The processor 202 may include one or more processing units (e.g., in a multi-core configuration, etc.). For example, the processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, ESG goals, carbon offset policies, user profiles, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is operating as described herein, whereby in performing such instructions the computing device 200 is transformed into a special-purpose computing device. It should be appreciated that the memory 204 may include a variety of different memories, each implemented in one or more of the functions or processes described herein.

In the example embodiment, the computing device 200 includes a presentation unit 206 that is coupled to the processor 202 (however, it should be appreciated that the computing device 200 could include output devices other than the presentation unit 206, etc.). The presentation unit 206 outputs information (e.g., ESG goals, status, carbon offset budget usage, etc.), either visually or audibly to a user of the computing device 200, for example, the consumer 112, etc. It should be further appreciated that various interfaces (as described herein) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

The computing device 200 also includes an input device 208 that receives inputs from the user (i.e., user inputs) such as, for example, travel requests, etc. The input device 208 is coupled to the processor 202 and may include, for example, a keyboard, a pointing device, a touch sensitive panel (e.g., a touch pad or a touch screen, etc.), another computing device, and/or an audio input device. Further, in various example embodiments, a touch screen, such as that included in a tablet, a smartphone, or similar device, may behave as both the presentation unit 206 and the input device 208.

In addition, the illustrated computing device 200 also includes a network interface 210 coupled to the processor 202 and the memory 204. The network interface 210 may include, without limitation, a wired network adapter, a wireless network adapter, a mobile network adapter (e.g., an NFC adapter, a BLUETOOTH adapter, etc.), or other device capable of communicating to one or more different networks, including the network 110. Further, in some example embodiments, the computing device 200 may include the processor 202 and one or more network interfaces incorporated into or with the processor 202.

Figure 3:
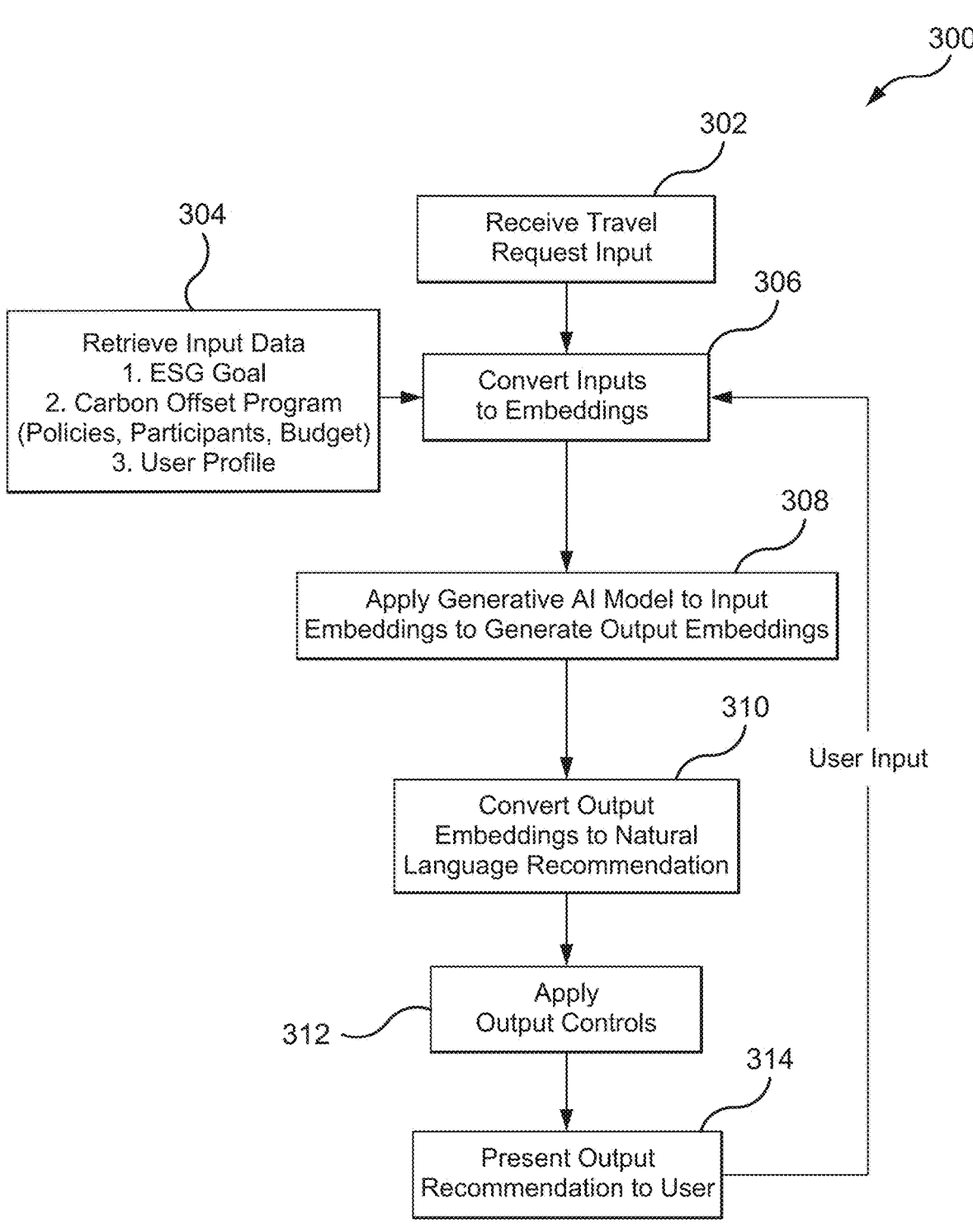
FIG. 3 is an example method for identifying travel recommendations and associated offsets, for users, consistent with corporate ESG policies.

FIG. 3 illustrates an example method 300 for identifying travel options for users, consistent with corporate policies. The example method 300 is described with reference to FIG. 1 as implemented in intelligence platform 108, and also with reference to the computing device 200. However, it should be understood that the methods herein are not limited to the example system 100 or the example computing device 200. Likewise, the systems and the computing devices herein should not be understood to be limited to the example method 300.

At the outset in the method 300, the user 106 submits a travel request to the intelligence platform 108. The travel request may be submitted, for example, through an interactive exchange between the user 106 and the intelligence platform 108. In one embodiment, intelligence platform 108 exposes a "chatbot" to the user 106, via the communication device 104, where the chatbot solicits the details of the travel requests, including, for example, a point of origin, a destination, a departure date, and a return date, etc. The chatbot may further solicit user travel preferences, selections of program participants, etc., as desired or required. In response, the user 106 provides the solicited information. It should be appreciated that the solicited information may be received as the user types into a prompt of an interface, or as the user speaks, i.e., through a suitable input device of the intelligence platform 108, etc.

In other example embodiments, the intelligence platform 108 may interact with the user 106 through various interfaces, prompts, templates, etc., whereby a chatbot may be omitted.

At 302, the intelligence platform 108 receives the travel request from the user 106.

At 304, the intelligence platform 108 retrieves additional input data from the data structure 116. In particular, as shown, the intelligence platform 108 retrieves the ESG goals for the corporation 102 from the data structure 116b. As explained above, the ESG goals may quantify specific reductions in emissions, increases in energy efficiency (e.g., for facilities of the corporation 102, suppliers, distributors, etc.), and/or transitions to renewable resources, etc. One example ESG goal may include a reduction in carbon emissions to reach zero corporate emissions by a target year (e.g., twenty years from the current year, etc.) and have 100-percent of air travel emissions offset each year. The intelligence platform 108 retrieves the carbon offset program details from the data structures 116c-e, which include the offset participants or options, the offset program policies, and the offset program budget. As explained above, the offset participants are options that include each of the potential participants, who offer carbon offsets. The carbon offsets generally include an action by the participant to be performed, which is associated with a particular carbon offset. The offset policies generally limit the ones of the participants that are permitted to be selected by the corporation 102. The offset policies may, for example, restrict the carbon offset activities to particular locations, restrict the particular types of carbon offset activities, etc. And, the offset budget is again the budget of the corporation 102 to purchase carbon offsets.

Also, the intelligence platform 108 retrieves the user profile for the user 106, and also the travel policies of the corporation 102 from the data structure 116*a*. Again, the user profile may include preferences of the user 106, as explained above, and the travel policies may include restrictions on travel purchases, costs, etc.

It should be appreciated that while the input data is limited, generally, to the travel request and the additional data included in the data structure 116, the intelligence platform 108 may retrieve, receive, rely on, etc., additional information as necessary to generate the output recommendation as described below. Such additional information may include, for example, flight schedules, carbon offset conversions (e.g., between airline miles and pounds of carbon offset, etc.), and carbon offset platforms (e.g., offset program options 116*c*, etc.) applicable to corporation 102 and the ESG goals of the corporation 102, etc.

With continued reference to FIG. 3, the intelligence platform 108 converts, at 306, the inputs (including the travel request and the additional input data) to embeddings suited to be input to the generative AI model. The embeddings (or more particularly vector embeddings) are mathematical representations of the content and, importantly, context of the string of text that are generated in (or by) the AI model, for example, to represent the corpus of information and its relevance to the prompt and answer.

At 308, the intelligence platform 108 applies the generative AI model to the input embeddings in order to generate output embeddings representative of an output recommendation. The output recommendation includes a recommendation for travel from the origin to the destination on the defined dates, i.e., an itinerary, and a recommendation for a carbon offset purchase.

At 310, the intelligence platform 108 converts the output embeddings to a natural language recommendation. At 312, intelligence platform 108 applies one or more controls to the recommendation.

Finally, the intelligence platform 108 presents, at 314, the output recommendation to the user 106. The output recommendation is generally presented to the user 106 in a manner consistent with the receipt of the travel request. As such, for example, the output recommendation may be presented by a chatbot to the user 106, via the communication device 104.

In response to presentation of the output recommendation, the user 106 may accept the output recommendation, through the chatbot, via the communication device 104. In response, the intelligence platform 108 instructs the travel management platform 110 to purchase travel consistent with the output recommendation. Once purchased, or at the same time (or prior), the intelligence platform 108 purchases the output recommendation carbon offsets from the program participant 114. In connection therewith, the intelligence platform 108 updates the ESG goals in the data structure 116*b* and the carbon offset budget in data structure 116*c*.

Alternatively, as shown in FIG. 3, the user 106 may provide additional user input, such as, for example, a request or an alternate travel plan and/or an alternate offset purchase. In response to the user input, the method 300 returns to step 306 and adds the additional user input to the existing travel request as additional input data (from steps 302 and 304) and repeats the subsequent steps to come to an additional output recommendation, which is presented to the user 106, at 314.

The user 106 may continue to provide input, which is considered by the intelligence platform 108, until an output recommendation is sufficient to be accepted by the user 106.

In view of the above, the systems and methods herein provide a generative artificial intelligence (AI) platform, which is configured to rely on ESG data and offset programs, in identifying travel recommendations and associated offsets, for corporate travel by users. In doing so, an objective, technical solution is provided to match corporate travel, for example, with ESG goals of the corporation and the user, whereby efficient solutions are presented in line with the available information and presented, in various example, with the impact associated therewith.

In connection with the above, the description above provides, among other things, corporations with a technical solution to monitor and achieve aggressive ESG goals, while also putting employees in a decision making role when it comes to the selection of the project receiving the carbon offsets (e.g., which serves to build acceptance, visibility and feedback at the employee level, etc.). Carbon offset purchases further promote increases in carbon capture through forestry, reduce emissions in energy production and industry, and offset certain carbon pressures through the transfer of clean technology. Such results, through the description herein, may be customized by each corporation to include projects in regions that the corporation target (e.g., region of offices, employees, etc.) to align their corporate priorities.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, from a user, a travel request for travel from an origin to a destination, the user associated with a first entity; (b) retrieving additional input data, the additional input data including one or more environmental, social and/or governance (ESG) goals of the first entity and a carbon offset program of the first entity; (c) applying a generative artificial intelligence (AI) model to the travel request, the retrieved one or more ESG goals and the data representative of the carbon offset program, to generate an output travel recommendation, the output travel recommendation including a travel itinerary and a carbon offset purchase option; (d) presenting the output travel recommendation to the user; and/or (e) purchasing the carbon offset option from the output travel recommendation, from a participant, in response to acceptance of the output travel recommendation by the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements/features recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for identifying travel options, for users, consistent with corporate policies, the method comprising:

receiving, from a user, at an intelligence platform computing device, a travel request for travel from an origin to a destination, the user associated with an entity;

retrieving, by the intelligence platform computing device, from a data structure, additional input data, the additional input data including one or more environmental, social and/or governance (ESG) goals of the entity and a carbon offset program of the entity; and then (1) applying, by the intelligence platform computing device, a generative artificial intelligence (AI) model to the travel request, the retrieved one or more ESG goals and the data representative of the carbon offset program, to generate an output travel recommendation, the output travel recommendation including a travel itinerary and a carbon offset purchase option;

(2) presenting, by the intelligence platform computing device, the output travel recommendation to the user;

(3) receiving, by the intelligence platform computing device, an acceptance of the output travel recommendation by the user; and (4) purchasing the carbon offset purchase option from the output travel recommendation, from a participant, in response to the acceptance of the output travel recommendation by the user.

2. The computer-implemented method of claim 1, wherein the travel request further includes a departure date and a return date; and wherein the itinerary is consistent with the departure date and the return date.

3. The computer-implemented method of claim 1, wherein the carbon offset program includes:

a number of carbon offset participants;

ones of the corporate policies, which are indicative of eligible ones of the carbon offset participants; and/or a budget for purchase of carbon offsets for the carbon offset program.

4. The computer-implement method of claim 1, wherein the additional data further includes a user profile, the user profile including a selection of one of multiple carbon offset participants.

5. The computer-implement method of claim 1, further comprising:

converting, by the intelligence platform computing device, the travel request and the additional input data to embeddings representative of the travel request and the additional input data, prior to applying the generative AI model; and converting the output travel recommendation from the embeddings into natural language, prior to presenting the output travel recommendation to the user.

6. The computer-implemented method of claim 5, further comprising:

applying, by the intelligence platform computing device, one or more output controls, prior to presenting the output travel recommendation to the user.

7. The computer-implemented method of claim 1, wherein the travel request is for airline travel; and wherein the itinerary includes at least one flight from the origin to the destination.

8. The computer-implemented method of claim 1, further comprising:

receiving, by the intelligence platform computing device, a decline of a prior output travel recommendation; and wherein applying the generative AI model includes applying the generative AI model to the decline of the prior output travel recommendation.

9. A non-transitory computer-readable storage medium including executable instructions for use in identifying travel recommendations, which, when executed by at least one processor, cause the at least one processor to:

receive, from a user, a travel request for travel from an origin to a destination, the user associated with an entity;

retrieve, from a data structure, additional input data, the additional input data including one or more environmental, social and/or governance (ESG) goals of the entity and a carbon offset program of the entity; and then (1) apply a generative artificial intelligence (AI) model to the travel request, the one or more ESG goals and the data representative of the carbon offset program, to generate an output travel recommendation, the output travel recommendation including a travel itinerary and a carbon offset purchase option; and (2) present, via an output device, the output travel recommendation to the user, thereby permitting acceptance of the output travel recommendation and purchase of the carbon offset purchase option from the output travel recommendation, from a participant, in response to an acceptance of the output travel recommendation by the user.

10. The non-transitory computer-readable storage medium of claim 9, wherein the travel request further includes a departure date and a return date; and wherein the itinerary is consistent with the departure date and the return date.

11. The non-transitory computer-readable storage medium of claim 9, wherein the executable instructions, when executed by the at least one processor, further cause the at least one processor to:

convert the travel request and the additional input data to embeddings representative of the travel request and the additional input data, prior to applying the generative AI model; and convert the output travel recommendation from the embeddings into natural language, prior to presenting the output travel recommendation to the user.

12. The non-transitory computer-readable storage medium of claim 9, wherein the carbon offset program includes:

a number of carbon offset participants;

policies indicative of eligible ones of the carbon offset participants; and/or a budget for purchase of carbon offsets for the carbon offset program.

13. The non-transitory computer-readable storage medium of claim 9, wherein the executable instructions, when executed by the at least one processor, further cause the at least one processor to receive a decline of a prior output travel recommendation; and wherein the executable instructions, when executed by the at least one processor, cause the at least one processor, in applying the generative AI model, to apply the generative AI model to the decline of the prior output travel recommendation, as part of the additional input data.

14. A system for identifying travel options, for users, consistent with corporate policies, the system comprising at least one computing device configured to:

receive, from a user, a travel request for travel from an origin to a destination, the user associated with an entity;

retrieve, from a data structure, additional input data, the additional input data including one or more environmental, social and/or governance (ESG) goals of the entity and a carbon offset program of the entity; and then (1) apply a generative artificial intelligence (AI) model to the travel request, the one or more ESG goals and the data representative of the carbon offset program, to generate an output travel recommendation, the output travel recommendation including a travel itinerary and a carbon offset purchase option; and (2) present, via an output device, the output travel recommendation to the user, thereby permitting acceptance of the output travel recommendation and purchase of the carbon offset purchase option from the output travel recommendation, from a participant, in response to an acceptance of the output travel recommendation by the user.

15. The system of claim 14, wherein the travel request further includes a departure date and a return date; and wherein the itinerary is consistent with the departure date and the return date.

16. The system of claim 14, wherein the at least one computing device is further configured to:

convert the travel request and the additional input data to embeddings representative of the travel request and the additional input data, prior to applying the generative AI model; and convert the output travel recommendation from the embeddings into natural language, prior to presenting the output travel recommendation to the user.

17. The system of claim 14, wherein the carbon offset program includes:

a number of carbon offset participants;

ones of the corporate policies, which are indicative of eligible ones of the carbon offset participants; and/or a budget for purchase of carbon offsets for the carbon offset program.

18. The system of claim 14, wherein the at least one computing device is further configured to:

receive a decline of a prior output travel recommendation; and apply the generative AI model to the decline of the prior output travel recommendation, as part of the additional input data.

* * * * *